United States Patent
Daujotas

(10) Patent No.: US 10,525,902 B2
(45) Date of Patent: Jan. 7, 2020

(54) CONVERTIBLE ROOF OPENING DETECTION FOR MIRROR CAMERA

(71) Applicant: Connaught Electronics Ltd., Tuam, County Galway (IE)

(72) Inventor: Tomas Daujotas, Troy, MI (US)

(73) Assignee: Connaught Electronics Ltd., Tuam, County Galway (IE)

( * ) Notice: Subject to any disclaimer, the term of this patent is extended or adjusted under 35 U.S.C. 154(b) by 108 days.

(21) Appl. No.: 15/632,891

(22) Filed: Jun. 26, 2017

(65) Prior Publication Data

US 2018/0370455 A1 Dec. 27, 2018

(51) Int. Cl.
*B60R 11/04* (2006.01)
*B60R 1/12* (2006.01)
*B60R 1/04* (2006.01)
*B60R 1/08* (2006.01)
*B60J 7/00* (2006.01)

(52) U.S. Cl.
CPC ............... *B60R 11/04* (2013.01); *B60R 1/04* (2013.01); *B60R 1/08* (2013.01); *B60R 1/12* (2013.01); *B60J 7/00* (2013.01); *B60R 2001/1253* (2013.01); *B60R 2300/205* (2013.01); *B60R 2300/8046* (2013.01); *B60R 2300/8066* (2013.01)

(58) Field of Classification Search
CPC .. B60R 11/04; B60R 1/04; B60R 1/08; B60R 1/12; B60R 2001/1253; B60R 2300/205; B60R 2300/8046; B60R 2300/8066; B60J 7/00
USPC .......................................... 348/148
See application file for complete search history.

(56) References Cited

U.S. PATENT DOCUMENTS

| | | | |
|---|---|---|---|
| 2007/0146481 A1* | 6/2007 | Chen .................. | B60R 1/12 348/148 |
| 2008/0239101 A1* | 10/2008 | Natsui .................. | H04N 5/20 348/234 |
| 2011/0115766 A1* | 5/2011 | Kerofsky ............. | G06T 5/003 345/207 |

(Continued)

OTHER PUBLICATIONS

Wüller, Dietmar et al.; "The usage of digital cameras as luminance meters"; Digital Photography III, Proc. of SPIE-IS&T Electronic Imaging, SPIE vol. 6502; Feb. 20, 2007 (11 pages).

*Primary Examiner* — Joseph G Ustaris
*Assistant Examiner* — Matthew David Kim
(74) *Attorney, Agent, or Firm* — Osha Liang LLP

(57) ABSTRACT

A mirror camera system includes a camera fixed to a top of a convertible roof of a vehicle and positioned to capture image data of a scene rear of the vehicle, and a rearview mirror with an integrated display connected to the camera. The mirror camera system is switchable between a camera mode, which shows the image data captured by the camera on the integrated display, and a standard mirror mode, which shows an environment behind the vehicle on a semitransparent reflective surface of the rearview mirror. The rearview mirror includes an electronic control unit that is configured to analyze the image data output from the camera to determine a luminance value of the scene, and further configured to send a signal to switch the mirror camera system from the camera mode to the standard mirror mode when the luminance value of the scene is within a predetermined threshold range.

23 Claims, 4 Drawing Sheets

(56) References Cited

U.S. PATENT DOCUMENTS

| | | | |
|---|---|---|---|
| 2014/0071279 A1* | 3/2014 | Mokashi | H04N 7/18 |
| | | | 348/148 |
| 2016/0039364 A1* | 2/2016 | Findlay | B60R 13/105 |
| | | | 340/468 |
| 2016/0229341 A1* | 8/2016 | Singhal | B60R 1/00 |
| 2017/0324909 A1* | 11/2017 | Choi | G06T 7/11 |
| 2018/0001836 A1* | 1/2018 | Pan | B60R 1/00 |
| 2018/0170261 A1* | 6/2018 | Kaltenmark | H04N 7/188 |
| 2018/0214777 A1* | 8/2018 | Hingorani | A63F 13/2145 |

\* cited by examiner

CONVERTIBLE ROOF OPENING DETECTION FOR MIRROR CAMERA

FIELD OF INVENTION

One or more embodiments of the present invention generally relate to a mirror camera system for a vehicle having a convertible roof, and a method for operating the same.

BACKGROUND

Mirror camera systems installed in vehicles having a convertible roof may include a rear-facing camera fixed to the top of the convertible roof. When the convertible roof is fully open, the field of view of the camera is blocked by the convertible roof, rendering the camera useless. If such mirror camera systems are not connected to a vehicle network bus, the driver will have to remember to switch the mirror camera system from camera mode to standard mirror mode to be able to view the scene rear of the vehicle while still facing the scene in front of the vehicle.

SUMMARY OF INVENTION

One or more embodiments of the present invention are directed to a mirror camera system for a vehicle having a convertible roof, the system including a camera fixed to a top of the convertible roof and positioned to capture image data of a scene rear of the vehicle, and a rearview mirror with an integrated display connected to the camera, the rearview mirror with the integrated display including an electronic control unit (ECU) that is configured to analyze the image data output from the camera to determine a luminance value of the scene, a semitransparent reflective surface, and the integrated display behind the semitransparent reflective surface, wherein the mirror camera system is switchable between a camera mode, which shows the image data captured by the camera on the integrated display, and a standard mirror mode, which shows an environment behind the vehicle on the semitransparent reflective surface, and wherein the ECU is further configured to send a signal to switch the mirror camera system from the camera mode to the standard mirror mode when the luminance value of the scene is within a predetermined threshold range.

One or more embodiments of the present invention are directed to a method for operating a mirror camera system that includes a rear-facing camera fixed to a top of a convertible roof of a vehicle, the method including turning on the mirror camera system in a camera mode, which shows image data of a scene captured by the camera on a rearview mirror with an integrated display, analyzing the image data captured by the camera to determine a luminance value of the scene, and sending a signal to switch the mirror camera system from the camera mode to a standard mirror mode when the luminance value of the scene is within a predetermined threshold range.

One or more embodiments of the present invention are directed to a mirror camera system for a vehicle having a convertible roof, the system including a camera fixed to a top of the convertible roof and positioned to capture image data of a scene rear of the vehicle, the camera comprising an ECU that is configured to analyze the image data captured by the camera to determine a luminance value of the scene, and a rearview mirror with an integrated display connected to the camera, the rearview mirror with the integrated display including a semitransparent reflective surface, and the integrated display behind the semitransparent reflective surface, wherein the mirror camera system is switchable between a camera mode, which shows the image data captured by the camera on the integrated display, and a standard mirror mode, which shows an environment behind the vehicle on the semitransparent reflective surface, and wherein the ECU is further configured to send a signal to switch the mirror camera system from the camera mode to the standard mirror mode when the luminance value of the scene is within a predetermined threshold range.

Other aspects and advantages of the invention will be apparent from the following description and the appended claims.

DETAILED DESCRIPTION

In the following detailed description, numerous specific details are set forth in order to provide a more thorough understanding of one or more embodiments of the invention. However, it will be apparent to one of ordinary skill in the art that the invention may be practiced without these specific details. In other instances, well-known features have not been described in detail to avoid unnecessarily complicating the description.

It is to be understood that the singular forms "a," "an," and "the" include plural referents unless the context clearly dictates otherwise. Thus, for example, reference to "a camera" includes reference to one or more of such cameras. Further, it is to be understood that "or," as used throughout this application, is an inclusive or, unless the context clearly dictates otherwise.

Terms like "approximately," "about," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Specific embodiments will now be described in detail with reference to the accompanying figures. Like elements may not be labeled in all figures for the sake of simplicity.

Figure 1:
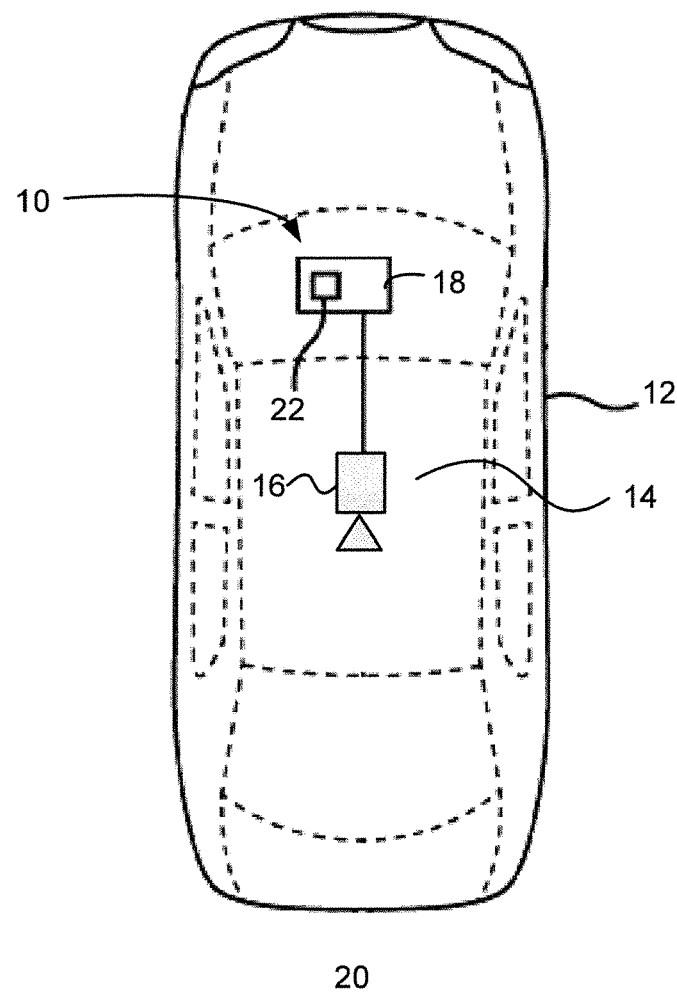
FIG. 1 shows a mirror camera system according to one or more embodiments of the present invention installed in a vehicle having a convertible roof.

FIG. 1 shows a mirror camera system 10 according to one or more embodiments of the present invention installed in a vehicle 12 having a convertible roof 14. According to one or more embodiments, the vehicle 12 may be a passenger car, which may include a sedan or a coupe, a truck, a sport utility vehicle, or any motor vehicle with a convertible roof, for example. Moreover, as defined in the present disclosure, "convertible roof" means any roof that is retractable between fully closed, partially open, and fully open positions. Hard top and soft top convertible roofs are within the scope of the present disclosure.

Figure 2:
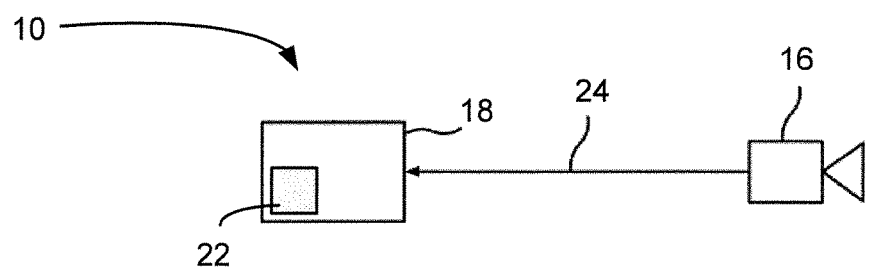
FIG. 2 shows a mirror camera system according to one or more embodiments of the present invention.

FIG. 2 shows the mirror camera system according to one or more embodiments of the present invention. Referring now to FIGS. 1 and 2, the mirror camera system 10 includes a camera 16 and a rearview mirror 18 connected to the camera 16. In one or more embodiments, the camera 16 may be a CCD (Charge-coupled Device) camera or a CMOS (Complementary Metal-oxide Semiconductor) camera, for example. The camera 16 may have a wide angle or be an extended dynamic range camera. Further, the camera 16 may have an expansive horizontal viewing angle. For example, according to one or more embodiments, the respective horizontal viewing angle may be in a range of 30° to 190°. As a result of the expansive horizontal viewing angle, an expansive view of the scene surrounding the vehicle 12 may be acquired, and consequently, an expansive image corresponding to the view may be generated for display. In one or more embodiments, the rearview mirror 18 may be connected to the camera 16 via at least one wire, for example. In other embodiments, the rearview mirror 18 may be wirelessly connected to the camera 16, such as via Bluetooth, Zigbee, infrared (IR), or Wi-Fi, for example. The type of wireless protocol employed is not limiting, and other wireless protocols are within the scope of the present invention. The camera 16 is fixed to the top of the convertible roof 14 of the vehicle 12. Further, the camera 16 is rear-facing. That is, the camera 16 is positioned to capture image data of a scene 20 rear of the vehicle 12.

Figure 3A:
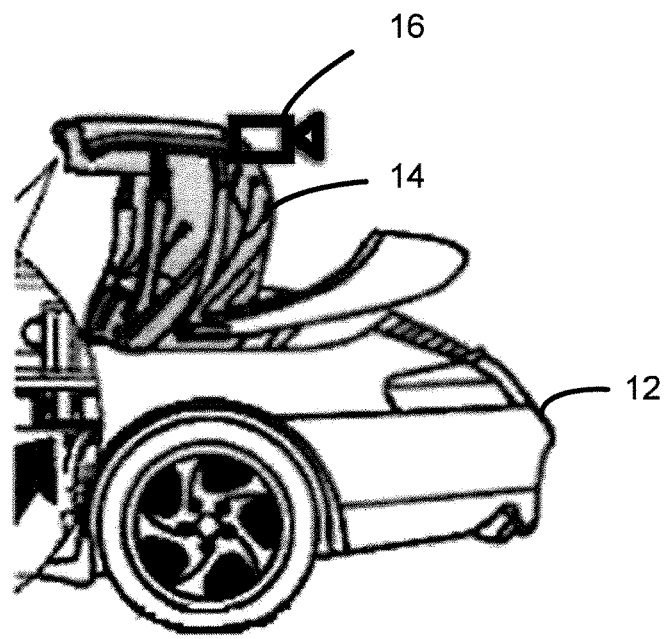
FIG. 3A shows a camera fixed to the top of the convertible roof when the roof is not fully open.

FIG. 3A shows the camera 16 fixed to the top of the convertible roof 14 of the vehicle 12 when the convertible roof 14 is partially (i.e., not fully) open. As shown, when the convertible roof 14 is not fully open, the camera 16 on top of the convertible roof 14 is able to capture image data of a scene exterior to and rear of the vehicle 10 without being obstructed by the convertible roof 14. According to one or more embodiments of the present invention, "not fully open" may mean any degree between partially open and fully closed where the convertible roof 14, and/or other vehicle parts or modules, such as a rear spoiler of the vehicle 12, do not obstruct or compromise the field of view of the camera 16.

Figure 3B:
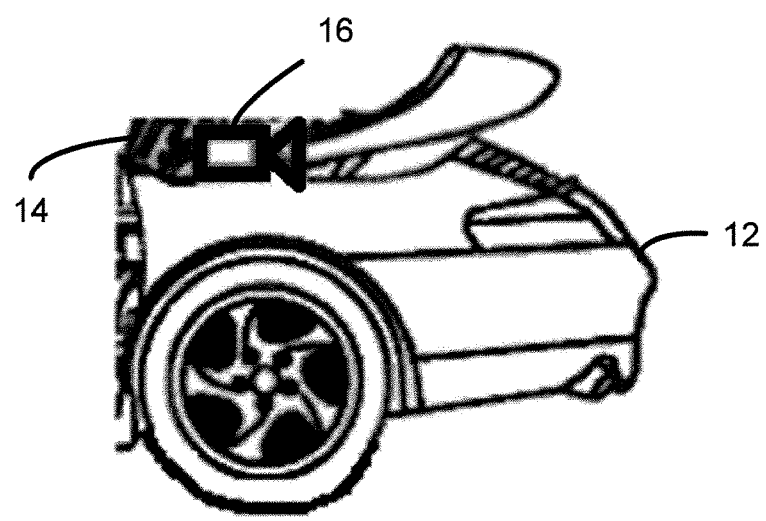
FIG. 3B shows a camera fixed to the top of the convertible roof when the roof is open.

FIG. 3B shows the camera 16 fixed to the top of the convertible roof 14 of the vehicle 12 when the convertible roof 14 is open. As shown, when the convertible roof 14 is open, the camera 16 on top of the convertible roof 14 cannot capture image data of a scene rear of the vehicle 12 because the field of view of the camera 16 is obstructed by the convertible roof 14. According to one or more embodiments of the present invention, "open" means any degree of openness where the convertible roof 14 obstructs or otherwise compromises the field of view of the camera 16, including partially open and fully open.

The mirror camera system 10 according to one or more embodiments of the present invention is isolated from an electronic system of the vehicle 12. That is, in one or more embodiments, there is no communication between the mirror camera system 10 and the electronic system of the vehicle 12. For example, the mirror camera system 10 is not connected to a vehicle network bus or a communication interface of the vehicle 12.

Referring back to FIG. 2, in one or more embodiments, the rearview mirror 18 may include an electronic control unit (ECU) 22, a semitransparent reflective surface, and an integrated display behind the semitransparent reflective surface. According to one or more embodiments, the integrated display of the rearview mirror 18 may be an LCD (liquid crystal display), an LED (light emitting diode) display, an OLED (organic light emitting diode) display an HD (high definition) display, a backlit display, a plasma display, a field emission display, standard definition (SD) display, or a CRT (cathode ray tube) display, for example. The type of integrated display of the rearview mirror 18 is not limiting, and other types of displays may be within the scope of the present disclosure. The mirror camera system 10 according to one or more embodiments of the present invention operates in at least two modes: a camera mode and a standard mirror mode. When the mirror camera system 10 is in camera mode, the image data captured by the camera 16 may be displayed on the integrated display of the rearview mirror 18. When the mirror camera system 10 is in standard mirror mode, an environment behind the vehicle 12 is shown on the semitransparent reflective surface of the rearview mirror 18. In one or more embodiments, the mirror camera system 10 is switchable between these modes. Those skilled in the art will appreciate that there may be more than two modes for the mirror camera system 10 without departing from the scope of the invention.

According to one or more embodiments of the present invention, the camera 16 is a color-sensitive camera that can detect light in the visible spectral range and thus provide photographic image data. In this way, when the mirror camera system 10 is in camera mode, the image data captured by the camera 16 may be displayed on the integrated display of the rearview mirror 18 or a head-unit display in color. As understood by those skilled in the art, if the camera 16 is color-sensitive, the color values in the RGB color space may be converted to the luminance-chrominance space (YUV/YCbCr) to determine corresponding grayscale values. For example, weighted values of R, G, B (i.e., the three sub-pixels of raw image data), may be combined to produce Y, a measure of overall brightness or luminance. U and V, the chrominance components, may be computed as a scaled difference between Y and the B and R values. That is, Y provides grayscale values, and U and V separately provide color information. As detailed further below, the grayscale values may be used in an analysis to determine a luminance value of the scene captured by the camera, according to one or more embodiments. In other embodiments, a black and white camera 16 may be used, which outputs the grayscale image data without any prior conversion.

As shown in FIG. 2, the camera 16 outputs image data 24 to the ECU 22 of the rearview mirror 18. In one or more embodiments, the image data 24 output by the camera is grayscale image data 24, and the ECU 22 of the rearview mirror 18 analyzes the image data 24 to determine a luminance value of the scene 20. According to one or more embodiments, the ECU 22 includes at least one microprocessor for performing the various analyses described herein for determining the luminance value of the scene 20. According to one or more embodiments, the luminance value of the scene 20 may be a brightness level of the camera, a representative pixel value, an exposure amount, or an automatic gain control level. As further discussed below, the luminance value of the scene 20 is compared with a corresponding predetermined threshold range to determine whether the luminance value of the scene 20 is representative of a scene that is "darker than night."

In embodiments where the luminance value of the scene is a brightness level of the camera 16, the ECU 22 of the rearview mirror 18 conducts a brightness level analysis to analyze the image data 24 output by the camera 16 to determine the luminance value of the scene 20. For example, as described in Wüller et al., "The usage of digital cameras as luminance meters," Digital Photography III, Proc. Of SPIE-IS&T Electronic Imaging, SPIE Vol. 6502 (2007)," after performing the necessary calibration, the algorithm shown in Equation 1 may be used to calculate the luminance value (Y) of the scene using the R, G, and B values output from a digital camera.

$$Y = 0.2162 R_{linear} + 0.7152 G_{linear} + 0.0722 B_{linear} \quad \text{Equation 1}$$

As another example, as understood by those having ordinary skill in the art, the conversion matrices shown in Equation 2 may be used to measure overall brightness in an SDTV system using the R, G, and B values output from the digital camera.

$$\begin{bmatrix} Y' \\ U \\ V \end{bmatrix} = \begin{bmatrix} 0.299 & 0.587 & 0.114 \\ -0.14713 & -.28886 & 0.436 \\ 0.615 & -0.51499 & -0.10001 \end{bmatrix} \begin{bmatrix} R \\ G \\ B \end{bmatrix}, \quad \text{Equation 2}$$

$$\begin{bmatrix} R \\ G \\ B \end{bmatrix} = \begin{bmatrix} 1 & 0 & 1.13983 \\ 1 & -0.39465 & -0.58060 \\ 1 & 2.03211 & 0 \end{bmatrix} \begin{bmatrix} Y' \\ U \\ V \end{bmatrix}.$$

As another example, as understood by those having ordinary skill in the art, the conversion matrices shown in Equation 3 may be used to measure overall brightness in an HDTV system using the R, G, and B values output from the digital camera.

$$\begin{bmatrix} Y' \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}, \quad \text{Equation 3}$$

$$\begin{bmatrix} R \\ G \\ B \end{bmatrix} = \begin{bmatrix} 1 & 0 & 1.28033 \\ 1 & -0.21482 & -0.38059 \\ 1 & 2.12798 & 0 \end{bmatrix} \begin{bmatrix} Y' \\ U \\ V \end{bmatrix}.$$

As another example, as understood by those having ordinary skill in the art, the matrix shown in Equation 4 may be used to measure overall brightness in a studio swing for an SDTV system using the R, G, and B values output from the digital camera.

$$\begin{bmatrix} Y' \\ U \\ V \end{bmatrix} = \begin{bmatrix} 66 & 129 & 25 \\ -38 & -74 & 112 \\ 112 & -94 & -18 \end{bmatrix} \begin{bmatrix} R \\ G \\ B \end{bmatrix}. \quad \text{Equation 4}$$

As another example, as understood by those having ordinary skill in the art, the matrix shown in Equation 5 may be used to measure overall brightness in a full swing for an SDTV system using the R, G, and B values output from the digital camera.

$$\begin{bmatrix} Y' \\ U \\ V \end{bmatrix} = \begin{bmatrix} 76 & 150 & 29 \\ -43 & -84 & 127 \\ 127 & -106 & -21 \end{bmatrix} \begin{bmatrix} R \\ G \\ B \end{bmatrix}. \quad \text{Equation 5}$$

In this way, the camera 16 may be used as a luminance meter. According to one or more embodiments of the invention, if the calculated luminance value of the scene 20 as a result of the brightness level analysis is within a threshold range of 0 to 400 μcd/m$^2$, then it may be determined that the scene 20 is darker than night. In other embodiments, the predetermined threshold range corresponding to the brightness level analysis may be 0 to 350 μcd/m$^2$, 0 to 300 μcd/m$^2$, 0 to 250 μcd/m$^2$, 0 to 200 μcd/m$^2$, 0 to 150 μcd/m$^2$, 0 to 100 μcd/m$^2$, 0 to 50 μcd/m$^2$, 0 to 40 μcd/m$^2$, 0 to 30 μcd/m$^2$, 0 to 20 μcd/m$^2$, 0 to 10 μcd/m$^2$, 0 to 5 μcd/m$^2$, 0 to 2 μcd/m$^2$, or 0 to 1 μcd/m$^2$.

In embodiments where the luminance value of the scene 20 is a representative pixel value, the ECU 22 of the rearview mirror 18 conducts a histogram analysis to analyze the image data 24 output by the camera 16 to determine the luminance value of the scene 20. As understood by those skilled in the art, the pixel value is a single number that represents the light intensity (i.e., brightness) at a given point in the image or scene, and the pixel values are represented inside the camera as binary numbers. For an 8 bit per color RAW data image, for example, the pixel values range from 0 to $(2^8-1)=255$ on a pixel value scale, as understood by those skilled in the art. On the pixel value scale, a pixel brightness value of 0 represents a completely black scene, and a pixel brightness value of 255 represents a completely white scene. Varying shades of grey are represented by the pixel brightness values between 0 and 255 of the pixel value scale.

According to one or more embodiments, the ECU 22 of the rearview mirror 18 conducts the histogram analysis to analyze the image data 24 output by the camera 16 to determine the luminance value of the scene 20 in the following way. Specifically, the ECU 22 determines the number of pixels that have a given pixel brightness value on the pixel value scale, and outputs a histogram based on the data. From this histogram analysis, the ECU 22 may calculate a representative pixel value. In one or more embodiments, the representative pixel value may be the mean, median, or mode of the resulting distribution, as understood by those skilled in the art. As a result of the histogram analysis, if the representative pixel value is within the predetermined threshold range of 0 to 40, 0 to 30, 0 to 20, 0 to 10, 0 to 5, 0 to 2, or 0 to 1, on the 0 to 255 pixel value scale, then it may be determined that the scene 20 is darker than night. Stated another way, if the resulting histogram is skewed to the right, then it may be determined that the scene is darker than night.

Referring now to FIGS. 4A-4D, example distribution curves that approximate a histogram resulting from a histogram analysis of image data 24 output from the camera 16 are shown. For each distribution curve, the x-axis is the pixel brightness value, which is a value along the 0 to 255 pixel value scale, and the y-axis is the number of pixels in the scene 20.

Figure 4A:
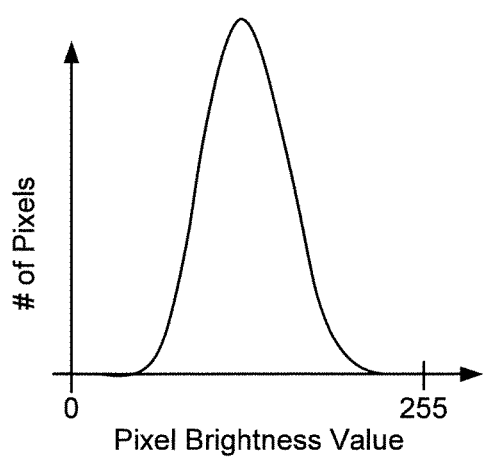
FIG. 4A shows an example distribution curve that approximates a histogram resulting from the analysis of image data from a scene under normal light conditions.

As a specific example, FIG. 4A shows an approximately normal distribution, which may be characterized by a representative pixel value of about 128. In this way, FIG. 4A shows an example distribution curve that approximates a histogram resulting from the analysis of image data 24 from a scene 20 under normal light conditions.

Figure 4B:
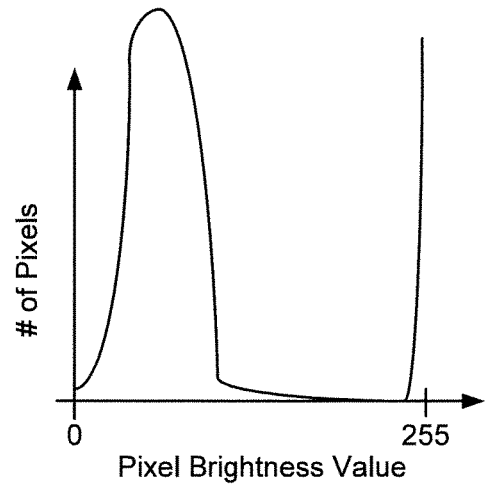
FIG. 4B shows an example distribution curve that approximates a histogram resulting from the analysis of image data from a night scene.

As another example, FIG. 4B shows a distribution that peaks on the left near the 0 pixel brightness value, and peaks again on the right near the 255 pixel brightness value. In this way, FIG. 4B shows an example distribution curve that approximates a histogram resulting from the analysis of image data 24 from a night scene. In this example, the peak on the left represents the darkness attributed to night from the scene, and the peak on the right represents illuminated elements of the night scene, which may include moonlight, street lamps, etc.

Figure 4C:
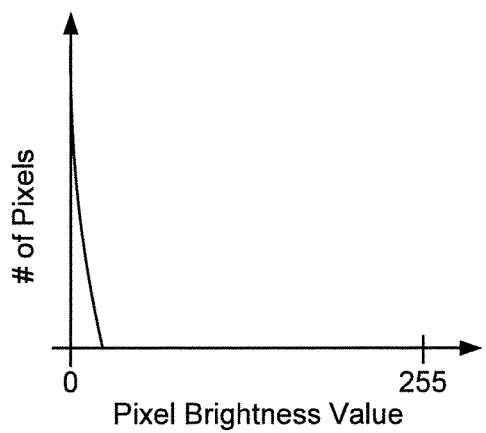
FIG. 4C shows an example distribution curve that approximates a histogram resulting from the analysis of image data from a scene that is darker than night.

As another example, FIG. 4C shows a distribution that peaks on the left near the 0 pixel brightness value. In other words, FIG. 4C shows a distribution that is skewed to the right with respect to the pixel brightness value. In this way, FIG. 4C shows an example distribution curve that approximates a histogram resulting from the analysis of image data 24 from a darker than night scene 20. In this example, the peak on the left represents the field of view of the camera 16 being obstructed by the convertible roof 14 of the vehicle 12 when the convertible roof 14 is open, as shown in FIG. 3B, for example. Because the field of view of the camera 16 is obstructed in this way, the scene 20 is almost completely void of light, and the resulting pixel representative value is within the predetermined threshold range of 0 to 40, 0 to 30, 0 to 20, 0 to 10, 0 to 5, 0 to 2, or 0 to 1, on the 0 to 255 pixel value scale, as previously described. Such obstruction by the convertible roof 14 renders camera mode of the mirror camera system 10 virtually useless for the driver of the vehicle 12, insofar as a discernable image of the scene 20 rear of the vehicle 12 is no longer displayed on the integrated display of the rearview mirror 18.

Figure 4D:
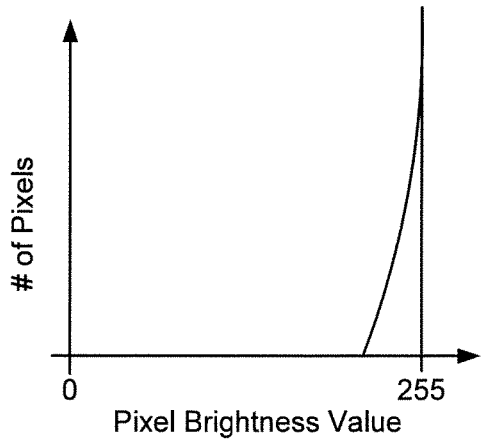
FIG. 4D shows an example distribution curve that approximates a histogram resulting from the analysis of image data from a very bright scene.

As another example, FIG. 4D shows a distribution that peaks on the right near the 255 pixel brightness value. In other words, FIG. 4D shows a distribution that is skewed to the left with respect to the pixel brightness value. In this way, FIG. 4D shows an example distribution curve that approximates a histogram resulting from the analysis of image data 24 from a very bright scene 20. In this example, the peak on the right represents illuminated elements of the bright scene, which may include sunlight, for example.

In embodiments where the luminance value of the scene 20 is an exposure amount, the ECU 22 of the rearview mirror 18 conducts a high dynamic range analysis to analyze the image data 24 output by the camera 16 to determine the luminance value of the scene 20. As understood by those skilled in the art, a high dynamic range analysis works by leveraging the exposure amount of different sub-pixels of the pixels in the image data 24. Specifically, each pixel in the image data 24 is divided into three sub-pixels (e.g., R, G, B), each having different sizes and different exposure times. Data from all three sub-pixels is weighted and summed together to form the high dynamic range of the scene, and very bright areas and very dark areas are normalized for the best quality picture, as understood by those skilled in the art. For example, if the ECU 22 detects that the smallest of three sub-pixels in the image data 24 is exposed for a short period of time, then the ECU 22 determines that the scene 20 is very bright. According to one or more embodiments, if the determined exposure amount of the smallest of three sub-pixels in the image data 24 as a result of the high dynamic range analysis is within an example threshold range of 0 to 12 milli-seconds, the ECU 22 determines that the scene is very bright. Further, if the ECU 22 detects that the largest of three sub-pixels in the image data 24 is exposed for a long period of time, then the ECU 22 determines that the scene 20 is darker than night. According to one or more embodiments, if the determined exposure amount of the largest of three sub-pixels in the image data 24 as a result of the high dynamic range analysis is within an example threshold range of 4 to 66 milli-seconds, then the ECU 22 determines that the scene is darker than night. Stated another way, if the ECU 22, when processing the high dynamic range of the scene 20, tries to amplify the light as much as possible (i.e., expose the sub-pixels for as long as possible) until a predetermined threshold range is reached, then the ECU 22 determines that the scene 20 is darker than night.

In embodiments where the luminance value of the scene is an automatic gain control (AGC) level of the camera 16, the ECU 22 of the rearview mirror 18 conducts an AGC analysis to analyze the image data 24 output by the camera 16 to determine the luminance value of the scene 20. According to one or more embodiments, the camera 16 may include an image sensor having an analog circuit. As understood by those skilled in the art, gain is a setting that controls the amplification of the signal from the image sensor of the digital camera. In one or more embodiments, the ECU 22 maximizes the gain of the analog circuit of the image sensor in order to amplify the available light coming into the image sensor. If the ECU 22 tries to amplify the light coming into the image sensor as much as possible, then the ECU 22 determines that the scene 20 is darker than night. Specifically, according to one or more embodiments, if the resulting AGC level is within an example threshold range of 200 to 255, then the ECU 22 determines that the scene 20 is darker than night. In other embodiments, if the resulting AGC level is within an example range of 0 to 50, then the ECU 22 determines that the scene 20 is very bright. The automatic gain control range can vary depending on the selected High-Dynamic range (HDR) scheme.

According to one or more embodiments, when the ECU 22 determines, as a result of one or more of the brightness level analysis, the histogram analysis, the high dynamic range analysis, and the AGC analysis, that the scene 20 is darker than night (i.e., the luminance value of the scene 20 is within a predetermined threshold range) as described above, the ECU 22 sends a signal to switch the mirror camera system 10 from the camera mode to the standard mirror mode. For example, the signal may be a warning or an icon on the integrated display of the rearview mirror 18 that is visible to the driver. Upon seeing the signal, the driver may manually switch the mirror camera system 10 from the camera mode to the standard mirror mode. In other embodiments, the ECU 22 may automatically switch the mirror camera system 10 from the camera mode to the standard mirror mode a predetermined time after sending the signal. According to one or more embodiments, the predetermined time after sending the signal may be about 3 seconds. However, this predetermined time is non-limiting, and other predetermined times are within the scope of embodiments of the present invention.

More specifically, if the ECU 22 determines that the scene 20 is darker than night, this means that the convertible roof 14 of the vehicle 12 has been opened. As a result, the open convertible roof 14, or other vehicle parts or modules, such as a rear spoiler of the vehicle 12, obstructs or otherwise blocks the camera 16 such that the camera 16 can no longer capture the scene rear of the vehicle 12. That is, opening the convertible roof 14 essentially renders the camera 16 fixed to the top of the convertible roof 14 useless for the driver. By switching the mirror camera system 10 from the camera mode to the standard mirror mode when the convertible roof 14 is open, the driver is still able to view the scene 20 rear of the vehicle 12, albeit via the semitransparent reflective surface of the rearview mirror 18, while facing the scene in front of the vehicle 12.

In other embodiments of the claimed invention, the ECU 22 may be included in the camera 12 instead of the rearview mirror 18. In such embodiments, the ECU 22 of the camera would be configured to analyze the image data 24 captured by the camera 16 by conducting at least one of a brightness level analysis, a histogram analysis, a high dynamic range analysis, and an AGC analysis, as previously described, to determine a luminance value of the scene 20. Further, the ECU 22 of the camera would be configured to send a signal to switch the mirror camera system 10 from the camera mode to the standard mirror mode when the luminance value of the scene is within a predetermined threshold range, as previously described. In some embodiments, the ECU 22 of the camera would be configured to automatically switch the mirror camera system 10 from the camera mode to the standard mirror mode a predetermined timed after sending the signal, as previously described.

Figure 5:
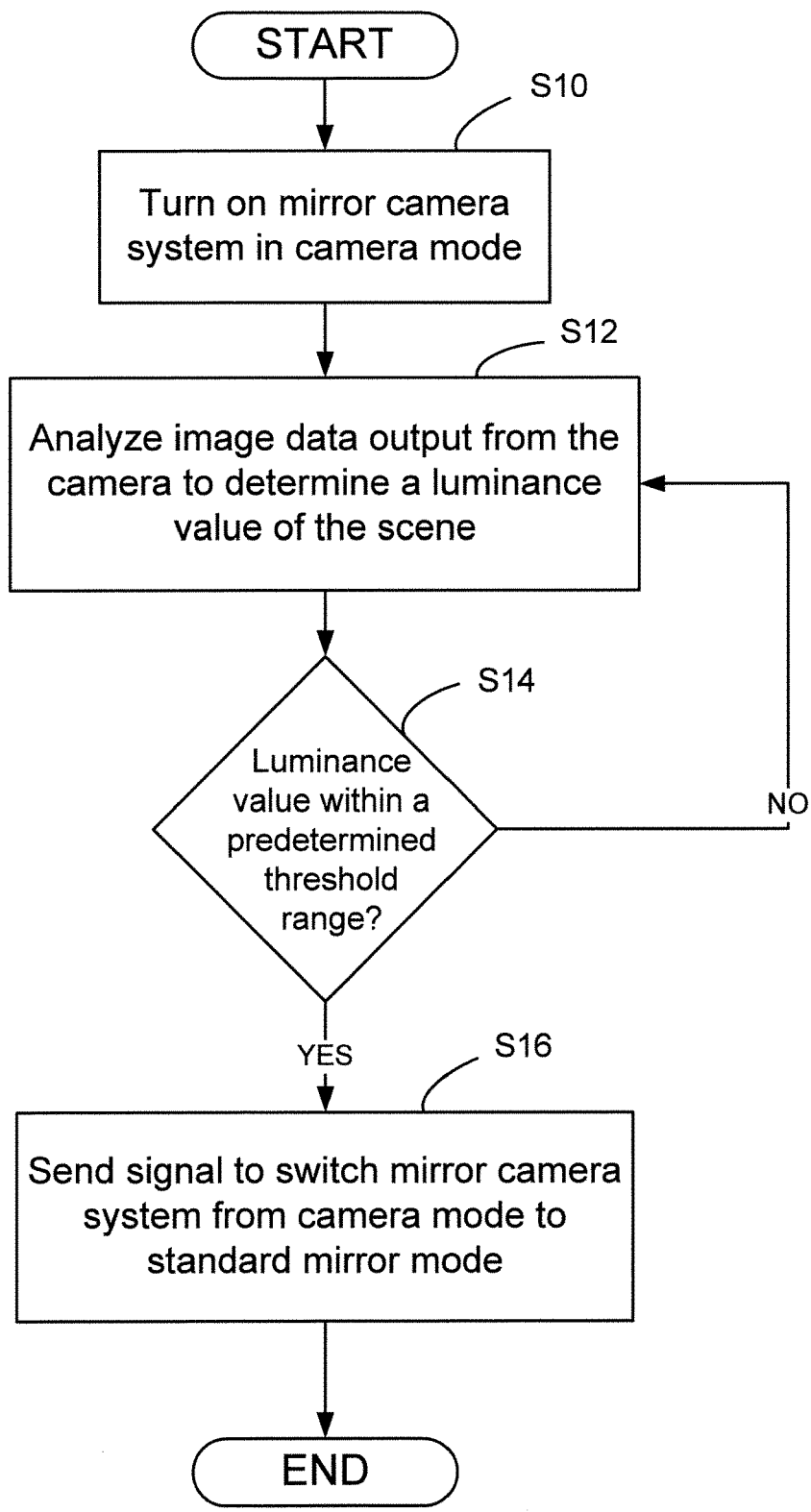
FIG. 5 shows a flowchart of a method for operating a mirror camera system according to one or more embodiments of the present invention.

Referring now to FIG. 5, a method for operating a mirror camera system 10 according to one or more embodiments of the present invention is shown. In step S10, the mirror camera system 10 is turned on in camera mode. As previously described, when the mirror camera system 10 is in camera mode, the image data 24 captured by the camera 16 may be displayed on the integrated display of the rearview mirror 18.

Next, in step S12, the ECU 22 analyzes image data 24 output from the camera 16 to determine a luminance value of the scene 20. As previously described, according to one or more embodiments, the luminance value of the scene 20 may be a brightness level of the camera 16, a representative pixel value, or an exposure amount. As also described, the analysis may be at least one of a brightness level analysis, a histogram analysis, and a high dynamic range analysis.

Next, in step S14, the ECU 22 determines whether the luminance value of the scene 20 is within a predetermined threshold range. That is, as previously described, the ECU 22 determines whether the luminance value of the scene 20 is representative of a scene that is darker than night. If, in step S14 it is determined that the luminance value of the scene 20 is not within the predetermined threshold range (NO), then the convertible roof 14 of the vehicle 12 has not been opened (i.e., the scene 20 is not darker than night), and the camera 16 is able to continue capturing image data 24 of a scene 20 rear of the vehicle 12 without obstruction while the mirror camera system 10 remains in camera mode. If, however, in step S14 it is determined that the luminance value of the scene 20 is within the predetermined threshold range (YES), the method proceeds to step S16, where the ECU 22 sends a signal to switch the mirror camera system 10 from camera mode to standard mirror mode, as previously described. In other embodiments, the method may also include a step where the ECU 22 automatically switches the mirror camera system 10 from the camera mode to the standard mirror mode a predetermined time after sending the signal, as previously described.

Because the ECU of the mirror camera system is able to detect when the convertible roof of the vehicle is opened, such opening blocking the camera such that the camera can no longer capture the scene rear of the vehicle, the ECU is able to warn the driver to switch the mirror camera system from camera mode to standard mirror mode or to automatically make the switch. As a result, the camera may be powered down to conserve battery when it is no longer useful for the driver, and the driver may still view the scene rear of the vehicle via the reflective surface of the rearview mirror while facing the scene in front of the vehicle. Thus, the complications and added costs that result from integrating the mirror camera system with the electronic system of the vehicle may be avoided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A mirror camera system for a vehicle having a convertible roof, the system comprising:
   a camera fixed to a top of the convertible roof and positioned to capture image data of a scene rear of the vehicle; and
   a rearview mirror with an integrated display connected to the camera, the rearview mirror with the integrated display comprising:
      a microprocessor that is configured to analyze the image data output from the camera to determine a luminance value of the scene;
      a semitransparent reflective surface; and
      the integrated display behind the semitransparent reflective surface,
   wherein the mirror camera system is switchable between a camera mode, which shows the image data captured by the camera on the integrated display, and a standard mirror mode, which shows an environment behind the vehicle on the semitransparent reflective surface,
   wherein the microprocessor is further configured to send a signal to switch the mirror camera system from the camera mode to the standard mirror mode when the luminance value of the scene is within a predetermined threshold range, and
   wherein the mirror camera system is switched from the camera mode to the standard mirror mode when the convertible roof is open, as a result of the camera being blocked such that the camera is not able to capture the scene rear of the vehicle.

2. The mirror camera system of claim 1, wherein the predetermined threshold range is 0-40 on a 0 to 255 pixel value scale.

3. The mirror camera system of claim 1, wherein the microprocessor is further configured to automatically switch the mirror camera system from the camera mode to the standard mirror mode a predetermined time after sending the signal.

4. The mirror camera system of claim 1, wherein the microprocessor conducts a brightness level analysis to analyze the image data output from the camera to determine the luminance value of the scene.

5. The mirror camera system of claim 1, wherein the microprocessor conducts a histogram analysis to analyze the image data output from the camera to determine the luminance value of the scene.

6. The mirror camera system of claim 1, wherein the microprocessor conducts a high dynamic range analysis to analyze the image data output from the camera to determine the luminance value of the scene.

7. A vehicle having a convertible roof, the vehicle comprising:
   the mirror camera system of claim 1, wherein the mirror camera system is isolated from an electronic system of the vehicle.

8. A method for operating a mirror camera system comprising a rear-facing camera fixed to a top of a convertible roof of a vehicle, the method comprising:
turning on the mirror camera system in a camera mode, which shows image data of a scene captured by the camera fixed to the top of a convertible roof of the vehicle, on a rearview mirror with an integrated display;
analyzing the image data captured by the camera to determine a luminance value of the scene; and
sending a signal to switch the mirror camera system from the camera mode to a standard mirror mode when the luminance value of the scene is within a predetermined threshold range as a result of the camera being blocked such that the camera is not able to capture a scene rear of the vehicle when the convertible roof is open.

9. The method of claim 8, wherein the predetermined threshold range is 0-40 on a 0 to 255 pixel value scale.

10. The method of claim 8, further comprising automatically switching the mirror camera system from the camera mode to the standard mirror mode a predetermined time after sending the signal.

11. The method of claim 8, wherein analyzing the image data output from the camera to determine the luminance value of the scene comprises conducting a brightness level analysis.

12. The method of claim 8, wherein analyzing the image data output from the camera to determine the luminance value of the scene comprises conducting a histogram analysis.

13. The method of claim 8, wherein analyzing the image data output from the camera to determine the luminance value of the scene comprises conducting a high dynamic range analysis.

14. A mirror camera system for a vehicle having a convertible roof, the system comprising:
a camera fixed to a top of the convertible roof and positioned to capture image data of a scene rear of the vehicle, the camera comprising a microprocessor that is configured to analyze the image data captured by the camera to determine a luminance value of the scene; and
a rearview mirror with an integrated display connected to the camera, the rearview mirror with the integrated display comprising:
a semitransparent reflective surface; and
the integrated display behind the semitransparent reflective surface,
wherein the mirror camera system is switchable between a camera mode, which shows the image data captured by the camera on the integrated display, and a standard mirror mode, which shows an environment behind the vehicle on the semitransparent reflective surface,
wherein the microprocessor is further configured to send a signal to switch the mirror camera system from the camera mode to the standard mirror mode when the luminance value of the scene is within a predetermined threshold range, and
wherein the mirror camera system is switched from the camera mode to the standard mirror mode when the convertible roof is open, as a result of the camera being blocked such that the camera is not able to capture the scene rear of the vehicle.

15. The mirror system of claim 14, wherein the predetermined threshold range is 0-40 on a 0 to 255 pixel value scale.

16. The mirror camera system of claim 14, wherein the microprocessor is further configured to automatically switch the mirror camera system from the camera mode to the standard mirror mode a predetermined time after sending the signal.

17. The mirror camera system of claim 14, wherein the microprocessor conducts a brightness level analysis to analyze the image data captured by the camera to determine the luminance value of the scene.

18. The mirror camera system of claim 14, wherein the microprocessor conducts a histogram analysis to analyze the image data captured by the camera to determine the luminance value of the scene.

19. The mirror camera system of claim 14, wherein the microprocessor conducts a high dynamic range analysis to analyze the image data captured by the camera to determine the luminance value of the scene.

20. A vehicle having a convertible roof, the vehicle comprising:
the mirror camera system of claim 14,
wherein the mirror camera system is isolated from an electronic system of the vehicle.

21. The mirror camera system of claim 1, wherein the microprocessor conducts an automatic gain control (AGC) analysis to analyze the image data output from the camera to determine the luminance value of the scene.

22. The method of claim 8, wherein analyzing the image data output from the camera to determine the luminance value of the scene comprises conducting an automatic gain control analysis.

23. The mirror camera system of claim 14, wherein the microprocessor conducts an automatic gain control analysis to analyze the image data captured by the camera to determine the luminance value of the scene.

* * * * *